United States Patent [19]

Möhrke et al.

[11] Patent Number: 5,364,039
[45] Date of Patent: Nov. 15, 1994

[54] TRANSPORT SYSTEM FOR TRANSPORTING TEXTILE BOBBINS TO WINDING STATIONS

[75] Inventors: Dieter Möhrke, Mönchengladbach; Jürgen Backhaus, Wegberg, all of Germany

[73] Assignee: W. Schlafhorst AG & Co., Moenchengladbach, Germany

[21] Appl. No.: 20,554

[22] Filed: Feb. 22, 1993

[30] Foreign Application Priority Data

Feb. 22, 1992 [DE] Germany .............................. 4205499

[51] Int. Cl.⁵ ............................................. B65H 67/06
[52] U.S. Cl. .................................................. 242/35.5 A
[58] Field of Search ............................... 242/35.5 A, 42

[56] References Cited

U.S. PATENT DOCUMENTS

| 4,907,755 | 3/1990 | Burysek et al. ............... | 242/35.5 A |
| 5,078,329 | 1/1992 | Grecksch et al. ............. | 242/35.5 A |
| 5,236,142 | 8/1993 | Teranishi et al. ............. | 242/42 |

FOREIGN PATENT DOCUMENTS

4116555A1 11/1991 Germany .

Primary Examiner—Stanley N. Gilreath
Attorney, Agent, or Firm—Shefte, Pinckney & Sawyer

[57] ABSTRACT

A transport system for transporting textile bobbins to winding stations of a textile winder on individual bobbin tube support members having a reciprocating supply conveyor extending along the winding stations for supplying bobbins on tube support members to the winding stations, a plurality of generally parallel winding station conveyors having entrances at the supply conveyor for receiving tube support members reciprocating on the supply conveyor and a plurality of control members disposed for engagement by tube support members, each control member having a first portion normally disposed in the tube support member path for engagement by tube support members and being displaced by the engagement and a second portion adjacent the winding station conveyor entrance normally disposed out of engagement with the tube support members and being connected at the first portion for movement into a position for engaging tube support members reciprocating on the supply conveyor to guide the tube support members past the winding station conveyors upon the first portion being displaced by a tube support member on the winding station conveyor.

10 Claims, 1 Drawing Sheet

TRANSPORT SYSTEM FOR TRANSPORTING TEXTILE BOBBINS TO WINDING STATIONS

BACKGROUND OF THE INVENTION

The present invention relates broadly to a transport system for transporting textile bobbins to winding stations and, more particularly, to such transport systems that incorporate control members for controlling the transport of bobbin tube support members along supply conveyors to winding station conveyors.

In several known transport arrangements for transporting tube support members to textile winding machines, the tube support members are individually transported on conveyor belts with lateral guides maintaining the tube support members in a defined path. U.S. Pat. No. 5,078,329 discloses an improvement in this type of tube support member transport arrangement in which an endless belt cyclically reciprocates to continuously transport tube support members past the entrances to winding station conveyors which each transport tube support members to a winding station of the textile winding machine. These winding station conveyors each include endless belts whose top runs extend sufficiently into the transport path of the tube support members being transported by the reciprocating endless belt of the supply conveyor that the tube support members are drawn onto the winding station conveyors, unless a sufficient reserve of tube support members is on a winding station conveyor that the last tube support member prevents entry of another tube support member, which then continues its reciprocation on the supply conveyor until it reaches a winding station conveyor having space to receive it. In this arrangement, the system must be dimensioned so that when a full complement of tube support members has been received on the winding station conveyor, the last tube support member prevents the entry of tube support members being reciprocated on the supply conveyor but without extending so far into the path of the tube support members on the supply conveyor as to impede their movement. However, this known arrangement does not provide adequate flexibility reconfiguring a conveyor system as the winding station conveyor must be of a length that is a multiple of the length of tube support members.

German Patent Document DE 41 16 555 A1 discloses a type of control that blocks tube support members from entering winding station conveyors by blocking movement of tube support members on the supply conveyor, which arrangement would not be adaptable to use with a reciprocating supply conveyor as a tube support member could not continue past a winding station conveyor and the blocking element would not prevent entry into the winding station conveyor of a tube support member being transported in one of the reciprocating directions.

Another apparatus for controlling tube support members entering a winding station conveyor is disclosed in German Patent Document DE-OS 36 09 071 which describes a restraint element for tube support members which is actuated by an external control device. A sensor that detects the passage of a tube support member or a bobbin request signal from the winding station activates the control device which mechanically triggers a barrier which is erected to prevent entrance of tube support members onto the branch conveyor.

Accordingly, improvements are desirable in assemblies of this type for controlling entry of tube support members onto winding station conveyors of textile winders from reciprocating supply conveyors, which allow for the use of winding station conveyors of any length, and do not require external control devices, and are simple in construction and reliable in operation.

SUMMARY OF THE INVENTION

It is accordingly an object of the present invention to provide a transport system for transporting textile bobbins to winding stations which addresses the aforesaid problems. More specifically, it is an object of the present invention to provide a transport system having a reciprocating supply conveyor and devices associated with the branch conveyors for controlling the travel of tube support members into the branch conveyors for transport to winding stations of the textile winder.

According to the preferred embodiment of the present invention, a transport system for transporting textile bobbins to winding stations of a textile winder on individual bobbin tube support members includes a reciprocating supply conveyor extending along the winding stations for supplying bobbins on tube support members to the winding stations, a plurality of generally parallel winding station conveyors having entrances at the supply conveyor for receiving tube support members reciprocating on the supply conveyor; and a plurality of control members, formed as two armed levers, disposed for engagement by the tube support members. Each control member preferably includes a first arm portion normally disposed in the path of the tube support members being conveyed on the winding station conveyor for engagement by tube support members being transported therepast and being displaced by the engagement and a second portion adjacent the winding station conveyor entrance normally disposed out of engagement with the tube support members and being connected to the first portion for movement into a position for engaging tube support members reciprocating on the supply conveyor to guide the tube support members past the winding station conveyors upon the first portion being displaced by a tube support member on the winding station conveyor. It is preferred that the winding station conveyors extend into the path of the tube support members being transported by the supply conveyor sufficient to engage and transport tube support members from the supply conveyor to the winding stations conveyors.

Preferably, the control members are disposed to return the first and second portions to their normal disposed positions upon disengagement of tube support members from the first portions. In that regard, the control members are pivoted intermediate the first and second portions for pivoting of the first and second portions alternately into and out of the path of tube support members. Further, the axes about which the control members are pivoted may be horizontal axes. These horizontal axes are disposed below the winding station conveyors for pivoting of the first and second portions downwardly out of the path of tube support members and upwardly into the path of tube support members. It is preferred that the second portions of the control members are formed to impose a greater pivoting force than the first portions to normally dispose the second portions downwardly out of the path of tube support members and to dispose the first portions upwardly into the path of tube support members. It is further preferred that the second portions of the control members have tube support member engaging surfaces extending sufficiently across the winding station entrances to guide tube support members across the entrances. These tube support member engaging surfaces have opposed ends adjacent the opposite sides of the entrances to the winding stations and the ends extend away from the supply conveyor to guide tube support members onto the contacting surfaces as the tube support members reciprocate across the winding station entrances.

Preferably, each winding station conveyor includes a pair of spaced, longitudinally extending conveyor components and the second control member portions are disposed for movement in the space between the conveyor components.

The transport system further preferably includes a resilient assembly for yieldably urging the control members to dispose the first and second members in their normally disposed positions. The control members are disposed to the side of the winding station conveyors for movement of the first and second portions horizontally into and out of the path of tube support members.

DESCRIPTION OF THE PREFERRED EMBODIMENT

Figure 2B:
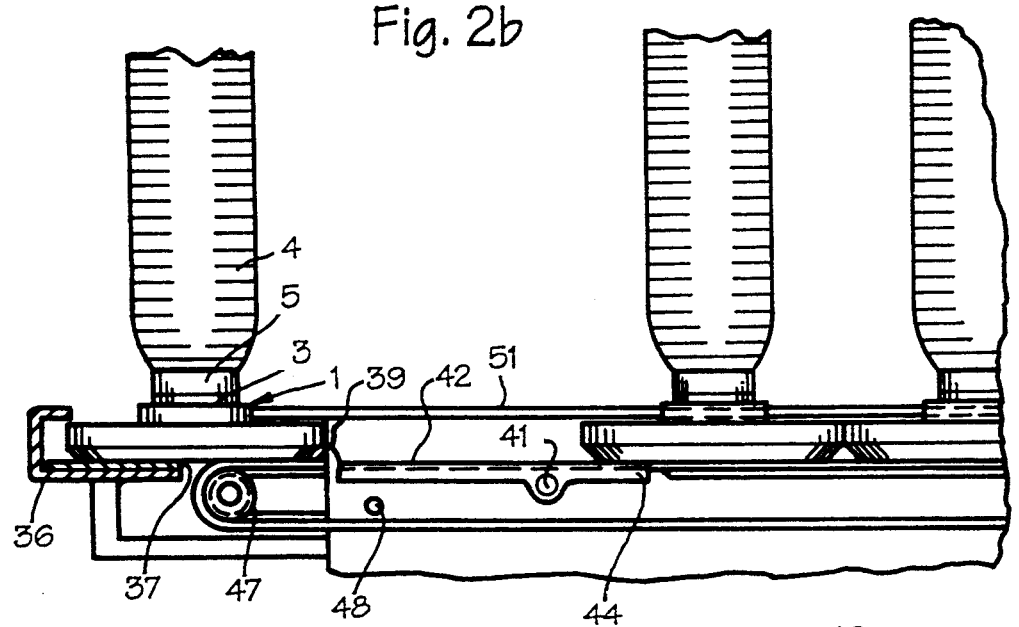
FIG. 2b is a side view of the control apparatus illustrated in FIG. 1 with the blocking device in an active position and a winding station branch conveyor filled to capacity.
Figure 1:
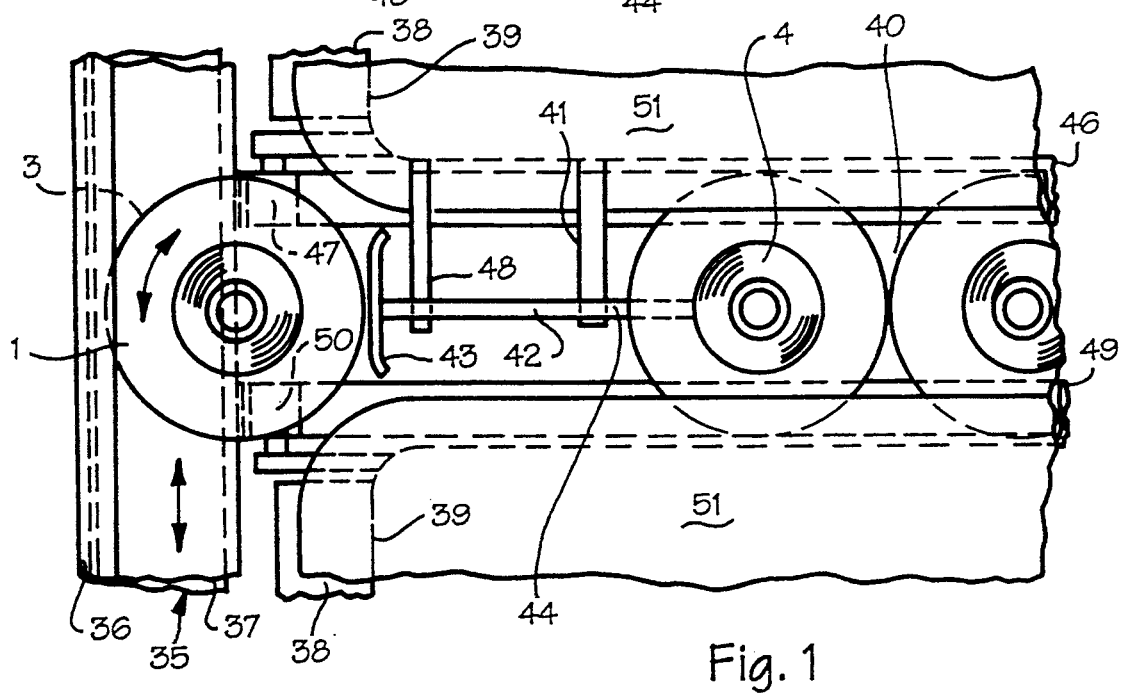
FIG. 1 is a plan view of an apparatus for controlling the travel of bobbin tube support members according to the preferred embodiment of the present invention.
Figure 2A:
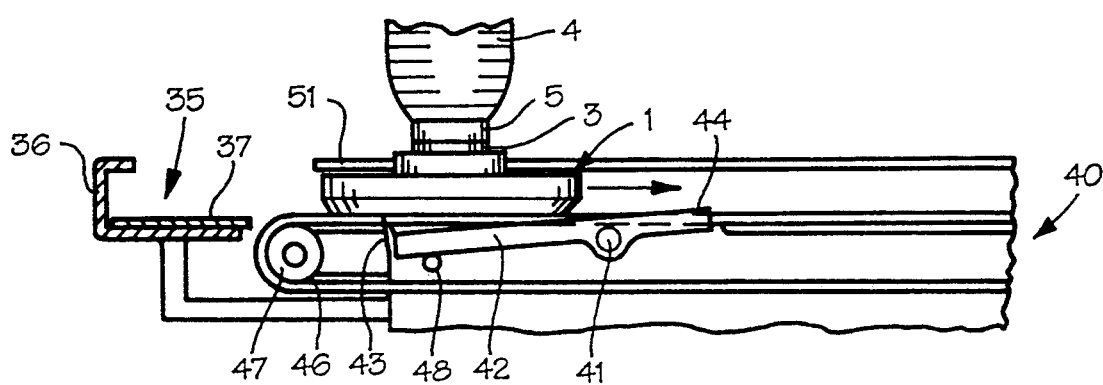
FIG. 2a is a side view of the control apparatus of FIG. 1 with the blocking device in a deactivated state allowing a tube support member to pass thereby.

Referring now to the accompanying drawings and initially to FIG. 1, a transport system for transporting textile bobbins to winding stations of a textile winder on individual bobbin tube support members according to the preferred embodiment of the present invention is operable to individually transport a plurality of textile yarn packages 4, each individually supported on a tube support member 1, to the winding stations of a textile winding machine. As seen in FIGS. 2a and 2b, each tube support member 1 is of the type having a cylindrical base 3 and a support portion in the form of a post 5 coaxially mounted on the cylindrical base 3 for receiving a textile yarn package 4 inserted thereon to support the respective textile yarn package 4 in an upright disposition. Each yarn package 4 comprises yarn built on a tube.

The textile winding machine includes a plurality of winding stations (not shown) at which yarn is unwound from the textile yarn packages 4 onto other yarn packages (not shown). As seen in FIG. 1, the transport assembly includes a supply conveyor 35 which delivers the tube support members 1 in a direction transverse to the winding stations for further passage of the tube support members 1 into and through each winding station via a plurality of further winding station or branch conveyors 40, each extending through a respective one of the winding stations.

The supply conveyor 35 is an endless belt 37 trained around two rollers (not shown), one roller being driven. The endless belt 37 may be driven in either direction and is therefore reversible as indicated by arrows in FIG. 1. The supply conveyor 35 extends transversely to the winding stations and is supported on the lower flange of a C-shaped guide channel 36 extending along a respective lateral side of the endless belt 37. The guide channel 36 is best seen in FIGS. 2a and 2b.

As seen in FIGS. 2a or 2b, the lateral extent of the endless belt 37 is greater than the lateral extent of the lower flange of the C-shaped guide channel 36 such that a portion of the endless belt 37 laterally toward the winding stations is not supported by the C-shaped guide channel 36. Additionally, as seen particularly in FIGS. 2a or 2b, the C-shaped guide channel 36 includes a top flange which is disposed at a predetermined height above the endless belt 37, as measured transversely both to the direction of travel of the endless belt 37 and to the lateral extent of the endless belt 37, sufficient to permit the cylindrical base of each tube support member 1 to travel under the top flange of the C-shaped guide channel 36. The direction of travel of the tube support members 1 on the supply conveyor 35 is periodically reversed to continuously present tube support members 1 to branch conveyors 40 for distribution to the winding stations.

To prevent each tube support member 1 from sliding laterally off the endless belt during its transport thereby, a plurality of generally horizontal cover plates 51 extend between the branch conveyors 40. Each horizontal cover plate 51 includes a generally vertical wall segment 39 extending parallel to the direction of travel of the endless belt 37 and laterally spaced from the C-shaped guide channel 36 for guiding the tube support members 1 therebetween and preventing sliding movement of the tube support member laterally beyond their supported position on the endless belt 37.

Further support for the tube support members 1 being transported by the supply conveyor 35 is provided by a plurality of support plates 38 which extend generally horizontally substantially at the same traverse level as the lower flange of the C-shaped guide channel 36 for supporting the undersides of the cylindrical bases 3 of the tube support members 1 which extend laterally beyond the endless belt 37. The support plates 38, unlike the endless belt 37, do not move and are, therefore, stationary and, as a result of the movement of the endless belt 37 relative to the stationary support plates 38, the tube support members 1, which are simultaneously supported on both the endless belt 37 and the support plates 38, tend to roll along the plates 38 and thereby rotate about their axes in a direction of rotation which corresponds to the direction of travel of the endless belt 37, as shown by arrows in FIG. 1. As seen in FIG. 1, if the endless belt 37 travels in a direction from top to bottom, the tube support members 1 thereon tend to rotate in a counterclockwise direction. Conversely, if the endless belt 37 is driven in the opposite direction (bottom to top as seen in FIG. 1) the tube support members 1 thereon tend to rotate in a clockwise direction during their translatory movement by the endless belt 37.

Each branch conveyor 40 is formed by a pair of laterally spaced endless belts 46,49, each having an end trained around a guide roller 47,50, as seen in FIGS. 1, 2a or 2b, and a downstream end trained around a drive roller (not shown), which is operatively connected to a conventional drive motor (not shown) for driving operation of the endless belts 46,49. Each guide roller 47,50 is rotatably mounted to a frame member of the textile winding machine. The upstream end of each endless belt 46,49 of the branch conveyor 40 is disposed adjacent the respective lateral side of the supply conveyor 35 and extends under the tube support members 1 being transported along the supply conveyor 35 for automatically diverting the tube support members 1 onto the branch conveyor 40 for transport to the winding stations. Each pair of the endless belts 46,49 which form the branch conveyor 40 of each respective winding station are disposed in spaced, parallel relation with their respective outer edges spaced a distance generally corresponding to the diameter of a tube support member 1 such that each tube support member 1 transported along a branch path 40 is supported by the pair of endless belts 46,49. As seen in FIG. 1, the horizontal cover plates 51 of respective adjacent winding stations partially overlie the cylindrical base 3 of each tube support member 1 being transported along the branch path 40 and thereby cooperate with the pair of endless belts 46,49 to stably transport the tube support members 1 to the winding stations.

With continued reference to FIG. 1, the cooperative interaction of the endless belts 46,49 of the branch conveyor 40 with the endless belt 37 of the supply conveyor 35 are illustrated. As can be seen, the guide rollers 47,50 around which each endless belt 46,49 is trained are disposed laterally inwardly and transversely below the tube support members 1 as they are transported along the supply conveyor 35. While the exposed underside of the cylindrical base of each tube support member 1 is normally supported by a support plate 38 during transport of each tube support member 1 on the supply conveyor 35, the support plates 38 do not extend into the region of each branch conveyor 40; instead, as each tube support member 1 reaches a branch conveyor 40, the respective closest one of the pair of endless belts 46,49 of the branch path 40 engages the exposed underside of the cylindrical base 3 of the tube support member 1 as it is transported beyond a support plate 38. Since the direction of travel of the top run of each endless belt 46,49 of the branch path 40 is laterally away from the endless belt 37 of the supply conveyor 35, the respective endless belt 46,49 of the branch path 40 draws the tube support member 1 onto the respective branch conveyor 40 while, simultaneously, the endless belt 37 of the supply conveyor 35 continues to impart translatory motion to the tube support member 1 along the supply conveyor 35. Accordingly, the tube support member is simultaneously drawn laterally away from the supply conveyor 35 while the supply conveyor 35 continues to translationally move the tube support member 1 and its translational movement eventually brings the tube support member 1 into engagement with the other respective endless belt 46,49 of the respective branch conveyor 40, which thereupon also exerts a force on the tube support member 1 to draw the tube support member 1 onto the respective branch conveyor 40. However, when a branch conveyor 40 is filled to capacity, the blocking device must be activated to ensure consistent and efficient distribution of tube support members 1 to the remaining branch conveyors. While all embodiments of the present invention include the supply conveyor 35, there are three embodiments of the blocking device, each of which will be described in greater detail presently.

According to the preferred embodiment of the present invention, and with reference to FIGS. 1, 2a and 2b, the blocking device includes a control member formed as a two armed lever 42,44 that is disposed intermediate the endless belts 46,49 in the branch path 40 adjacent the entrance thereto. The two armed lever 42,44 is pivotably mounted to a horizontal pivot pin 41 which is in turn mounted to the frame of the textile winder. A first portion or arm 44 of the two armed lever 42,44 is configured to be shorter and less massive than the second portion or arm 42 of the two armed lever 42,44. Therefore, and with reference to FIGS. 2a and 2b, the two armed lever tends to rotate in a counterclockwise direction naturally bringing the second arm 42 out of the tube support member path and placing the first arm 44 in the tube support member path. Rotation to a completely vertical orientation is prevented by the inclusion of a stop pin 48 which projects outwardly from the frame of the textile winder to act as an abutment to position the two armed lever 42,44 for operational engagement with a traveling tube support member 1. A barrier 43, forming a tube support member engagement surface, is mounted to the end portion of the second arm 42 and is oriented generally perpendicularly to the second arm 42. As previously mentioned, the stop pin 48 is positioned so that the barrier 43 is just below a plane defined by the endless belts 46,49 and the lower surface of a passing tube support member 1. With reference to FIG. 2a, it can be seen that with the second arm 42 abutted against the stop pin 48, the barrier 43 is out of contact with a passing traveling tube support member 1. However, due to the placement of the pivot pin 41, the first arm 44 of the two armed lever is positioned to extend a short distance into the path of a passing tube support member 1. Therefore, as the endless belts 46,49 cause the tube support member 1 to pass over the second arm 42 the leading edge of the tube support member 1 encounters the first arm 44 and, as the tube support member 1 passes over the first arm 44, the first arm 44 is deflected downwardly, which, in turn, causes the second arm 42 to be deflected upwardly thereby placing the barrier 43 into the path of any further oncoming tube support members 1, preventing their passage onto the branch conveyor 40. As can be seen in FIG. 1, the barrier 43 is curved so that the rotating, traveling tube support members that are being transported along the distribution path will continue to rotate and pass by the branch path that is blocked. Further, as can be seen in FIGS. 2a and 2b, the barrier 43 is beveled in vertical section, to more closely correspond to the chamfer of the base plate 2 of the tube support members 1. As a result, the barrier 43 can pivot upwardly even more closely behind the leading tube support member 1, and can thus perform its blocking function for the trailing tube support member 1.

With reference to FIG. 2a, after a tube support member 1 has passed over the first arm 44 thereby erecting the barrier 43, there is nothing further to maintain the first arm 44 in a lowered position. Accordingly, gravity acts to lower the second arm 42 into abutment with the stop pin 48 thereby placing the first arm 44 back into the path of any further oncoming tube support members.

With reference to FIG. 1, it can be seen that if the branch path 40 leading to a particular winding station is filled with tube support members 1, the last entering tube support member 1 will rest on the first arm 44 maintaining the first arm in a downwardly biased position thereby erecting and maintaining the barrier 43 thereby preventing any further tube support members from entering that branch conveyor 40. As previously described, the constantly recirculating supply conveyor 35 will carry any further tube support members past a blocked branch conveyor 40 and, in the manner previously described, will distribute the tube support members 1 to any open branch conveyor 40.

As can be seen, the present invention provides a method of preventing overfilling of branching paths leading to winding stations which is free of all external controls. The simplicity of the mechanical design allows ongoing winding operations with the tube support members 1 being constantly distributed to branch conveyors 40 which are clear, the tube support members 1 automatically bypassing branch paths 40 which are blocked by a raised barrier 43. The simplicity of the mechanical design provides inherent reliability without the need for complicated electronics or other sensing devices and can provide any number of cycles of operation without failure.

While the blocking device of the control apparatus of the present invention is useful for automatically maximizing the use of branch paths, the same device in the prior discussed embodiment and two other embodiments may also be used for automatic spacing of traveling tube support members. Accordingly, the following descriptions of the other two preferred embodiments of the present invention are illustrated by reference to their spacing function. However, the winding station branch conveyor control function is equally applicable to each of the following embodiments.

While the present invention is described with a two armed lever pivoting about a horizontal axis, the present invention is of broader scope and utility and it will be appreciated by those skilled in the art that the two armed lever could be successfully arranged and mounted to pivot about a vertical axis without departing from the scope of the present invention.

By the above, a simple mechanical device is provided to temporarily interrupt and therefore control the travel of traveling tube support members along transport conveyors without the necessity of external controls.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A transport system for transporting textile bobbins to winding stations of a textile winder on individual bobbin tube support members, comprising:
   a reciprocating supply conveyor extending along the winding stations for supplying bobbins on tube support members to the winding stations;
   a plurality of generally parallel winding station conveyors having entrances at the supply conveyor for receiving tube support members reciprocating on said supply conveyor; and
   a plurality of control members disposed for engagement by tube support members, at least one control member being associated with a respective one of the winding station conveyors, each control member having a first portion normally disposed in the path of tube support members being conveyed on said winding station conveyor for engagement by tube support members being transported therepast and being displaced by said engagement, and a second portion adjacent said winding station conveyor entrance normally disposed out of engagement with tube support members and being connected to said first portion for movement into a position for engaging tube support members reciprocating on said supply conveyor to guide the tube support members past said winding station conveyors upon said first portion being displaced by a tube support member on said winding station conveyor.

2. A transport system according to claim 1 wherein said winding station conveyors extend into the path of tube support members being transported by said supply conveyor sufficient to engage and transport tube support members from the supply conveyor to the winding station conveyors.

3. A transport system according to claim 1 wherein said control members are disposed to return said first and second portions to their normally disposed positions upon disengagement of tube support members from said first portions.

4. A transport system according to claim 3 wherein said control members are pivoted intermediate said first and second portions for pivoting of said first and second portions alternately into the path of tube support members.

5. A transport system according to claim 4 wherein said control members are pivoted about horizontal axes.

6. A transport system according to claim 5 wherein said horizontal axes are disposed below said winding station conveyors for pivoting of said first and second portions downwardly out of the path of tube support members and upwardly into the path of tube support members.

7. A transport system according to claim 6 wherein said second portions are formed to impose a greater pivoting force than said first portions to normally dispose said second portions downwardly out of the path of tube support members and said first portions upwardly in the path of tube support members.

8. A transport system according to claim 6 wherein each said winding station conveyor comprises a pair of spaced, longitudinally extending conveyor components and said control member portions are disposed for movement in the space between said conveyor components.

9. A transport system according to claim 1 wherein said second portions have tube support member engaging surfaces extending sufficiently across said winding station entrances to guide tube support members across said entrances.

10. A transport system according to claim 9 wherein said tube support member engaging surfaces have opposed ends adjacent the opposite sides of the entrances to the winding stations, said ends extending away from said supply conveyor to guide tube support members onto said engaging surfaces as the tube support members reciprocate across said winding station entrances.

* * * * *